… … …

United States Patent [19]

Brown

[11] Patent Number: 5,496,061

[45] Date of Patent: Mar. 5, 1996

[54] SEAT MOUNTED AIR BAG ASSEMBLY

[75] Inventor: Louis R. Brown, Oxford, Mich.

[73] Assignee: TRW Vehicle Safety Systems Inc., Lyndhurst, Ohio

[21] Appl. No.: 414,941

[22] Filed: Mar. 31, 1995

[51] Int. Cl.⁶ .................................................. B60R 21/22
[52] U.S. Cl. ..................................... 280/730.2; 280/743.1
[58] Field of Search ............................. 280/730.2, 730.1, 280/743.1, 743.2, 732, 728.1, 728.2

[56] References Cited

U.S. PATENT DOCUMENTS

| | | | |
|---|---|---|---|
| 3,897,961 | 8/1975 | Leising et al. | 280/730.1 |
| 3,953,049 | 4/1976 | Surace, et al. | 280/730.1 |
| 4,946,191 | 8/1990 | Putsch | 280/730.2 |
| 5,112,079 | 5/1992 | Haland et al. | 280/730.2 |
| 5,222,761 | 6/1993 | Kaji et al. | 280/730.2 |
| 5,251,931 | 10/1993 | Semchena et al. | 280/730.1 |
| 5,255,937 | 10/1993 | EmamBakhsh et al. | 280/732 |
| 5,273,309 | 12/1993 | Lau et al. | 280/730.2 |
| 5,324,072 | 6/1994 | Olson et al. | 280/730.2 |
| 5,348,342 | 9/1994 | Haland et al. | 280/730.2 |

FOREIGN PATENT DOCUMENTS

| | | | |
|---|---|---|---|
| 0611684 | 8/1994 | European Pat. Off. . | |
| 4019596 | 1/1992 | Germany | 280/730.2 |
| 5-38993 | 2/1993 | Japan | 280/730.2 |
| 93/08042 | 4/1993 | WIPO | 280/728.1 |

OTHER PUBLICATIONS

Advertisement brochure from PARS GmbH regarding "Seat Integrated Airbag for Side Impact Protection", PARSO7. doc, Sep. 1993.

Advertisement from Johnson Controls, Inc. regarding "Structural Seat with Integrated Air Bag", Automotive Engineering, p. 27, May, 1994.

Primary Examiner—Margaret A. Focarino
Assistant Examiner—Peter C. English
Attorney, Agent, or Firm—Tarolli, Sundheim & Covell

[57] ABSTRACT

An air bag module (80) is mounted on a vehicle seatback (22). The module (80) includes an air bag (90) which has a narrow elongate neck portion (200) and a wide body portion (210). The neck portion (200) and the body portion (210) when inflated lie adjacent to the head and neck of an occupant (52) of the seat (12). The body portion (210) of the air bag (90) does not inflate until it has moved past the head and neck of the occupant (52). The body portion (210) of the air bag (90) has a relatively large height as compared to the neck portion (200) when the air bag is inflated. The body portion (210) is engageable by the head and neck of a forward leaning vehicle occupant.

28 Claims, 5 Drawing Sheets

SEAT MOUNTED AIR BAG ASSEMBLY

BACKGROUND OF THE INVENTION

1 Technical Field

The present invention relates to a vehicle safety apparatus and particularly relates to an air bag module including an inflatable vehicle occupant restraint, such as an air bag, for protecting a vehicle occupant in the event of a side impact to the vehicle.

2. Description of the Prior Art

It is known to inflate an air bag to protect a vehicle occupant in the event of a side impact to a vehicle. The air bag is stored in a deflated condition, together with an inflator, in the vehicle seat in which the occupant is seated. In the event of a side impact to the vehicle, the inflator is actuated and the air bag is inflated into a position between the vehicle occupant and the adjacent vehicle door. The air bag can protect the vehicle occupant from forcefully striking or being struck by parts of the vehicle such as the door. The air bag can also protect the vehicle occupant from objects which might intrude through the door or a side window of the vehicle, such as a pole or a tree, during the side impact.

SUMMARY OF THE INVENTION

The present invention is a vehicle safety apparatus comprising a seat for supporting an occupant of the vehicle in a seated position with the occupant's head disposed adjacent to a side structure of the vehicle. The seat includes a seat bottom portion and a seatback. An inflatable vehicle occupant restraint is located in a housing for, when inflated, protecting the occupant of the vehicle. The inflatable restraint has a neck portion and a body portion which lie adjacent to the occupant's head and neck when inflated for engagement by the occupant's head and neck. An inflator is located in the housing for directing inflation fluid into the inflatable restraint to inflate the inflatable restraint. The vehicle safety apparatus includes means for sensing a side impact to the vehicle of a magnitude sufficient to require protection of the vehicle occupant and for actuating the inflator to inflate the inflatable restraint in response to sensing the side impact to the vehicle. The vehicle safety apparatus also includes support means for supporting the housing on the seatback for deployment of the body portion of the inflatable restraint between the vehicle occupant's head and the vehicle side structure. The neck portion of the inflatable restraint has an elongate tubular configuration and is connected in fluid communication between the inflator and the body portion of the inflatable restraint. The neck portion of the inflatable restraint, when inflated, has a longitudinal central axis extending through the neck portion. The neck portion of the inflatable restraint, when inflated, has a relatively small height as measured in a vertical direction transverse to its central axis. The body portion of the inflatable restraint, when inflated, has a relatively large height as measured in the vertical direction transverse to the central axis of the neck portion.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

Description of Preferred Embodiment

Figure 1:
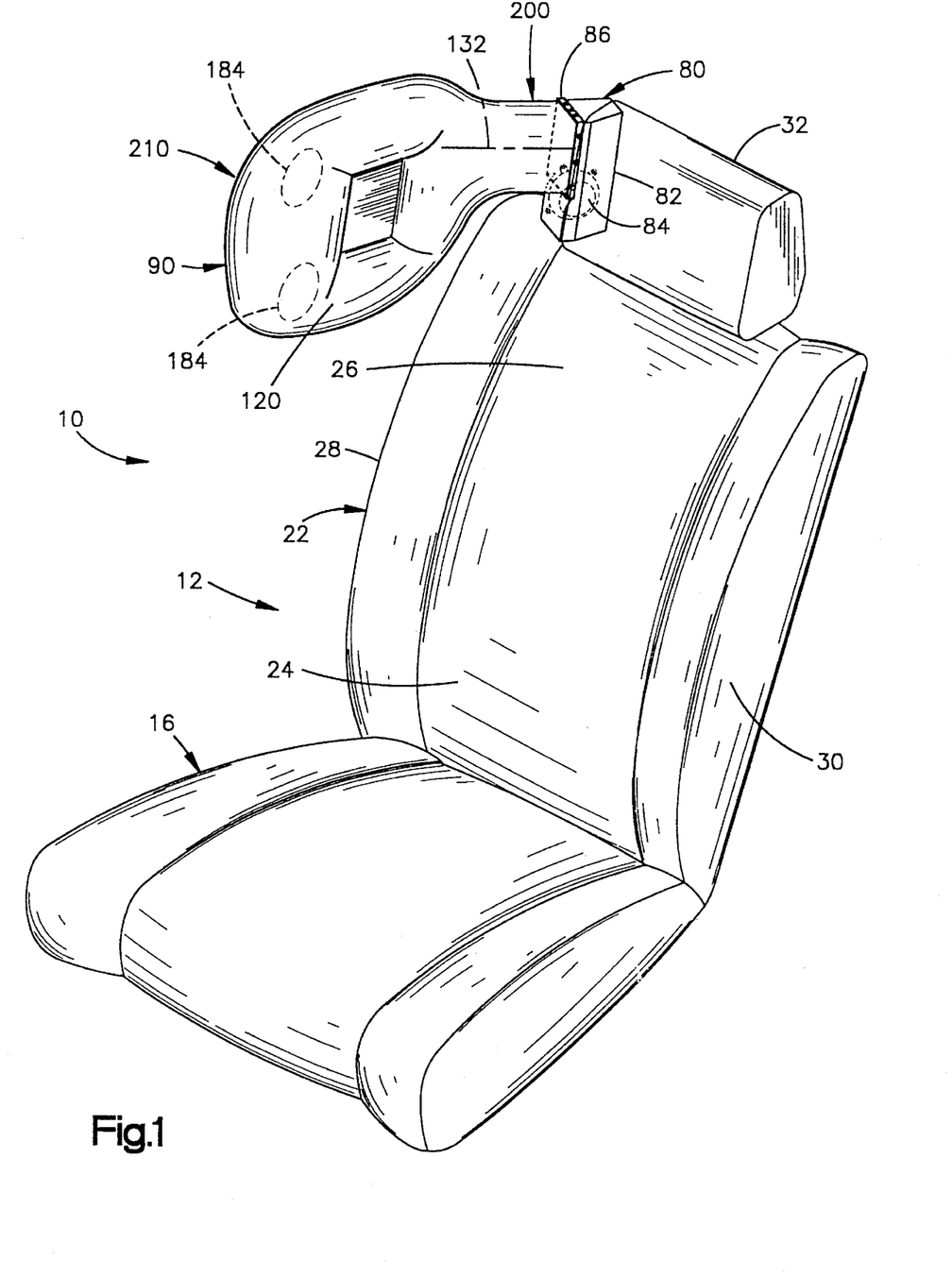
FIG. 1 is a perspective view of a vehicle seat and an air bag module constructed in accordance with the present invention, showing the air bag in an inflated condition.

The present invention relates to a vehicle safety apparatus and particularly relates to an air bag module including an inflatable vehicle occupant restraint, such as an air bag, for protecting a vehicle occupant in the event of a side impact to the vehicle of a magnitude sufficient to require protection of the vehicle occupant. The present invention is applicable to various vehicle safety apparatus constructions. As representative of the present invention, FIG. 1 illustrates a vehicle safety apparatus 10.

The vehicle safety apparatus 10 includes a seat 12 which is illustrated as a front passenger seat for an occupant 52 (FIG. 3) of a vehicle 14. The seat 12 (FIGS. 1–3) includes a seat bottom cushion 16 supported on a portion 18 of the body 20 of the vehicle 14. The seat 12 includes a seatback 22 connected with the seat bottom cushion 16. The seatback 22 has a lower portion 24 and an upper portion 26. The seatback 22 also has an outboard side 28 and an inboard side 30.

The seatback 22 includes a headrest 32, which is supported on or which may be formed as one piece with the upper portion 26 of the seatback. The headrest 32 is covered with a fabric material covering, such as cloth or leather. A seat frame member 34 is disposed in the seatback 22. A front-to-back axis 36 (FIG. 4) extends through the seat 12 in a direction parallel to the direction of travel of the vehicle. The axis 36 is centered between the outboard side 28 and the inboard side 30 of the seatback 22.

The vehicle body 20 includes a door 40 disposed adjacent to the seat 12. The door 40 includes a window 42 having an inner major side surface 44. A B-pillar 46 of the vehicle 14 is disposed behind (to the left of, as viewed in FIG. 3) the door 40. It should be understood that the present invention is usable in a vehicle such as a van which has no side window adjacent to the seat 12, to protect the vehicle occupant from contact with the side structure of the vehicle.

Figure 2:
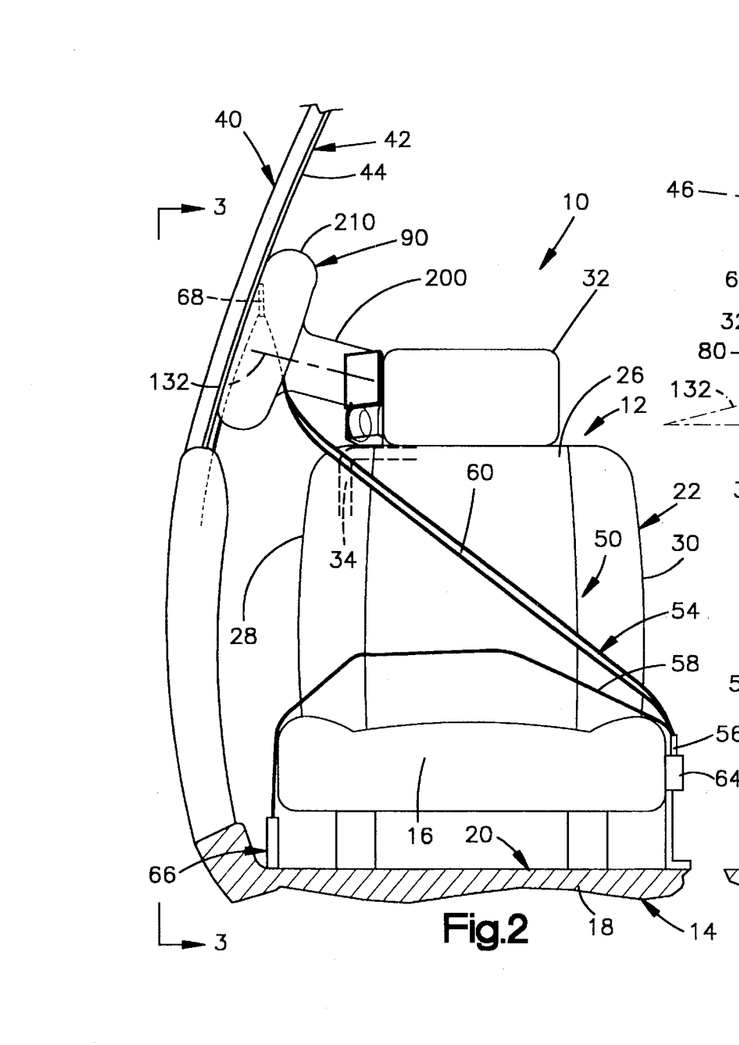
FIG. 2 is a schematic view of the vehicle seat and air bag module of FIG. 1 showing the air bag in an inflated condition between a vehicle occupant and a vehicle door.
Figure 3:
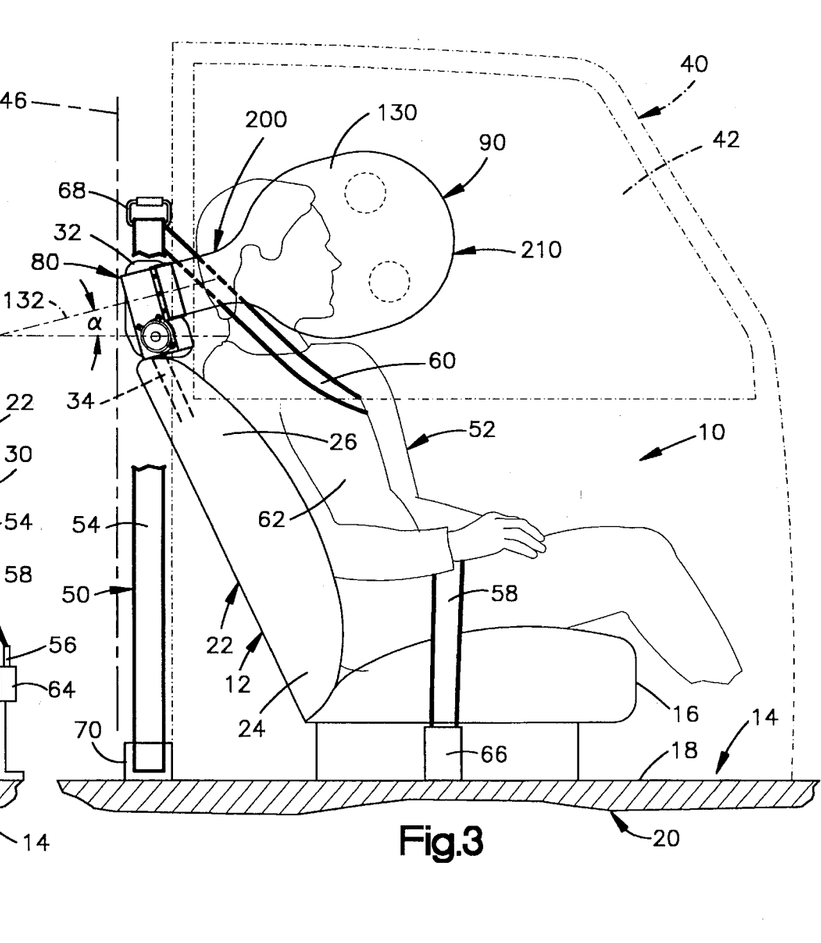
FIG. 3 is a schematic illustration taking generally along line 3—3 of FIG. 2.

The vehicle 14 includes a three-point continuous loop seat belt system 50 (FIGS. 2 and 3) for restraining an occupant 52 of the seat 12. The seat belt system 50 is shown in FIGS. 2 and 3 in an engaged condition. The seat belt system 50 includes a single continuous length of belt webbing 54 which is divided by a movable tongue assembly 56 into a lap portion 58 and a shoulder portion 60. The lap portion 58 of the belt webbing 54 extends across the seat bottom cushion 16 and across the lap of the occupant 52. The shoulder portion 60 of the belt webbing 54 extends across the seatback 22 and across the upper torso 62 of the occupant 52 of the seat 12. The tongue assembly 56 is engaged with a buckle 64 anchored to the vehicle body 20.

One end of the length of belt webbing 54 is connected at an anchor point 66 to the vehicle body 20. From the anchor point 66, the belt webbing 54 extends across the seat bottom cushion 16 to the tongue assembly 56 and buckle 64. The belt webbing 54 then extends from the tongue assembly 56 across the torso 62 of the vehicle occupant 52 to a D-ring 68 supported on the vehicle B-pillar 46. The belt webbing 54 extends downward from the D-ring 68 to a seat belt webbing retractor 70 which is supported in a known manner on the vehicle body 20.

The vehicle safety apparatus 10 includes an air bag module 80 which is mounted on the vehicle seat 12. The air bag module 80 includes a housing 82, an inflator 84, a retainer or retaining ring 86 and an air bag 90.

The housing 82 (FIG. 7) is made from sheet metal and has a box-shaped configuration which defines a chamber 98 in the housing. The housing 82 has an upper portion 100 for storing the air bag 90 in a folded condition (for clarity, the folded portions of the air bag 90 are not shown in FIG. 7). The upper portion 100 of the housing 82 includes a back wall 101. A forward edge portion 102 of the housing 82 defines a generally rectangular deployment opening 103 (FIG. 9) in the housing 82 opposite the back wall 101. A lower portion 104 of the housing 82 receives the inflator 84.

The inflator 84 is illustrated as a pyrotechnic inflator which uses the combustion of gas-generating material to generate inflation fluid in the form of gas to inflate the air bag 90. The module 80 alternatively could include a stored gas inflator or a hybrid inflator, both of which use at least some stored gas released from the inflator to inflate an air bag. As illustrated with the reference numeral 112 in dot-dash lines in FIG. 7, a stored gas inflator or a hybrid inflator could extend through both the lower portion 104 and the upper portion 100 of the housing 82.

An inflator mounting ring 114 together with a plurality of fasteners 116 secures the inflator 84 in the lower portion 104 of the housing 82. The vehicle safety apparatus 10 includes known means indicated schematically at 118 (FIG. 7) for sensing a side impact to the vehicle 14 and for actuating the inflator 84 in response to the sensing of a side impact. The means 118 may include a side impact sensor and vehicle circuitry for electrically actuating the inflator 84 in response to sensing a side impact to the vehicle 14. The inflator 84 has one or more fluid outlets (not shown) disposed inside the housing 82 for directing inflation fluid into the chamber 98 in the housing upon actuation of the inflator to inflate the air bag 90.

The retaining ring 86 (FIGS. 7 and 8) is a ring-shaped member preferably made from sheet metal. The retaining ring 86 has a rectangular configuration which defines a central opening 110 in the retaining ring. The rectangular central opening 110 in the retaining ring 86 has the same configuration as the deployment opening 103 in the housing 82.

Figure 5:
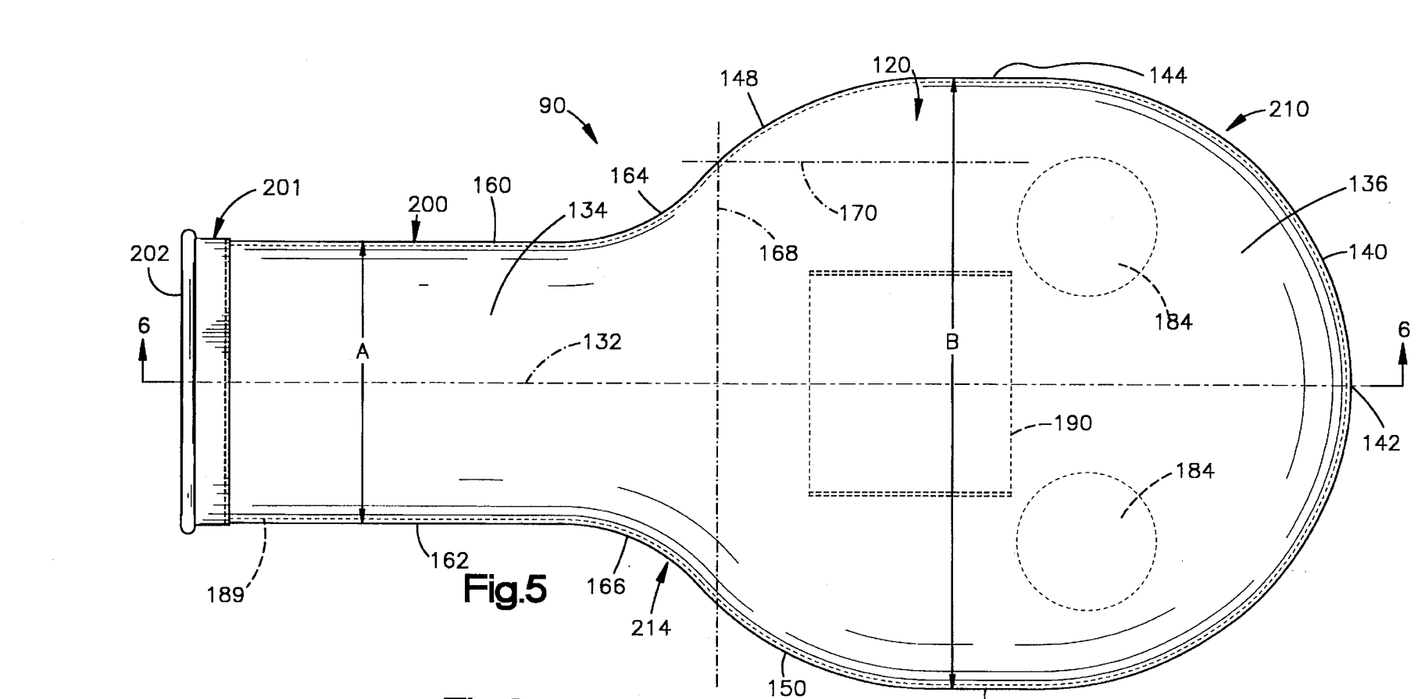
FIG. 5 is an elevational view of the air bag of FIG. 1 shown in a partially inflated condition.
Figure 6:
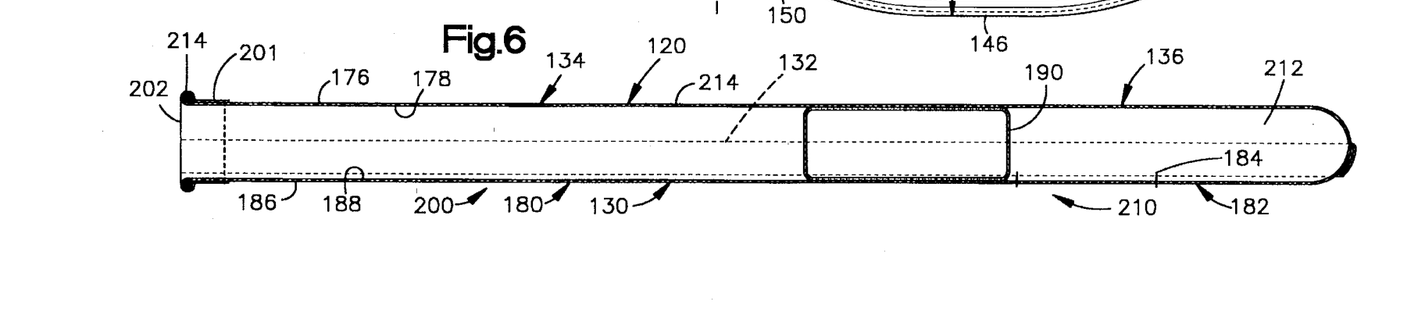
FIG. 6 is a sectional view taken along 6—6 of FIG. 5.

The air bag 90 (FIGS. 5 and 6) is formed from two separate fabric material panels, i.e., an inner panel 120 and an outer panel 130. The panels 120 and 130 are sewn together in a manner as illustrated in FIGS. 5 and 6. The panels 120 and 130 are substantially identical to each other and therefore only the inner panel 120 will be described in detail.

The inner panel 120 is a single piece of fabric material which is symmetrical about a longitudinal central axis 132 of the air bag 90. The inner panel 120 has an elongate neck portion 134 and an oblong body portion 136. The inner panel 120 of the air bag 90 has an outer major side surface 176 (FIG. 6) and an inner major side surface 178.

The body portion 136 of the inner panel 120 has an arcuate outer peripheral side portion 140 (FIG. 5) which is centered on the axis 132. A terminal end 142 of the air bag 90 is disposed on the axis 132. The arcuate side portion 140 merges into parallel axially extending side portions 144 and 146. The side portions 144 and 146 merge into arcuate side portions 148 and 150, respectively, disposed adjacent to the elongate neck portion 134 of the inner panel 120.

The elongate neck portion 134 of the inner panel 120 is defined generally by parallel axially extending side portions 160 and 162. The one side portion 160 merges via an arcuate side portion 164 with the side portion 148 of the body portion 136 of the inner panel 120. The other axially extending side portion 162 of the elongate neck portion 134 merges via an arcuate side portion 166 with the side portion 150 of the body portion 136 of the inner panel 120.

The outer panel 130 (FIG. 6) of the air bag 90 is a single piece of fabric material which is symmetrical about the longitudinal central axis 132 of the air bag. The outer panel 130 includes an elongate neck portion 180 and an oblong body portion 182. A pair of vents illustrated schematically at 184 are disposed in the body portion 182 of the outer panel 130. The vents 184 are of a known construction and extend between an outer major side surface 186 and an inner major side surface 188 of the outer panel 130. The inner major side surface 188 of the outer panel 130 is presented toward the inner major side surface 178 of the inner panel 120. With the exception of the vents 184, the outer panel 130 is identical to the inner panel 120.

The air bag 90 is assembled in a known manner by stitching the inner panel 120 to the outer panel 130 with a double-needle stitching line indicated schematically at 189 (FIG. 5). Next, the air bag 90 is turned inside out by pulling the body portions 136 and 182 of the panels 120 and 130 through the opening between the ends of the elongate neck portions 134 and 180 of the panels. The seams of the air bag 90 are top stitched in a known manner. A known tether 190 is sewn between and extends between the inner side surface 178 of the inner panel 120 and the inner side surface 188 of the outer panel 130.

The elongate neck portions 134 and 180 of the panels 120 and 130 together form an elongate neck portion, designated 200, of the air bag 90. A first end portion or mouth portion 201 of the elongate neck portion 200 defines an inflation fluid opening 202 into the air bag 90. The elongate neck portion 200 of the air bag 90, including the mouth portion 201, is tubular in configuration and surrounds the inflation opening 202. The longitudinal central axis 132 of the air bag 90 extends through the elongate neck portion 200 of the air bag 90 and forms a longitudinal central axis of the elongate neck portion.

The body portions 136 and 182 of the panels 120 and 130 together form a body portion, designated 210, of the air bag 90. The body portion 210 defines an inflation fluid volume 212 of the air bag 90. A second end portion 214 of the elongate neck portion 200 of the air bag 90 places the inflation fluid volume 212 in fluid communication with the inflation fluid opening 202.

For purposes of illustration, it can be considered that the dividing line between the elongate neck portion 200 and the body portion 210 is along an imaginary line 168. The imaginary line 168 extends perpendicular to an imaginary line 170 at a point of intersection between the line 170 and the outer edge of the air bag 90. The imaginary line 170 extends parallel to and is spaced equidistant between the side portion 144 of the body portion 136 of the inner panel 120 and the side portion 160 of the elongate neck portion 134.

One air bag 90 constructed in accordance with the preferred embodiment of the invention has an overall length of about 570 mm when in the partially inflated condition illustrated in FIGS. 5 and 6. The elongate neck portion 200 of the one air bag 90, as measured between the inflation fluid opening 202 and the imaginary line 168 (FIG. 5) has a length of about 230 mm. The body portion 210 of the one air bag 90, as measured between the imaginary line 168 and the terminal end 142 of the air bag, has a length of about 340 mm. The elongate neck portion 200 of the one air bag 90 when inflated has a height "A" (FIG. 5) of about 120 mm as measured in a direction perpendicular to the axis 132. The body portion 210 of the one air bag 90 when inflated has a height "B" of about 310 mm as measured in the direction perpendicular to the axis 132. In other air bags constructed in accordance with the present invention, the body portion 210 of the air bag 90 may have a height "B" which is in the range of from about twice the height "A" of the elongate neck portion 200 to about four times the height "A" of the elongate neck portion.

Figures 7, 8:
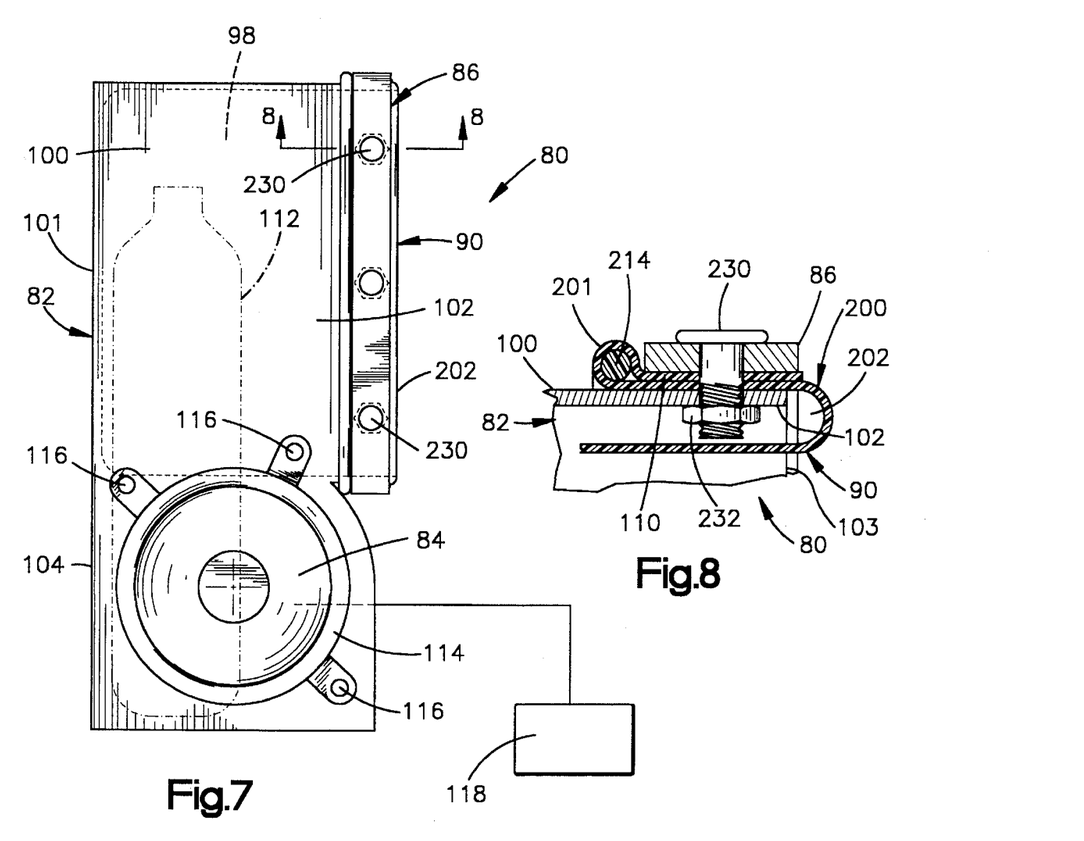
FIG. 7 is a view of the air bag module of FIG. 1.
FIG. 8 is an enlarged partial sectional view of the air bag module taken along 8—8 of FIG. 7.

After the air bag 90 is sewn, a thin flexible welt 214 (FIG. 8) is placed around the mouth portion 201 of the air bag 90. The mouth portion 201 of the air bag 90 is then folded back over the welt 214 and sewn to itself, as best seen in FIG. 8, to encircle the welt.

In assembling the air bag 90 to the housing 82, the retaining ring 86 (FIGS. 7 and 8) is placed around the mouth portion 201 of the air bag. The mouth portion 201 extends through the central opening 110 of the retaining ring 86. The retaining ring 86 and the mouth portion 201 of the air bag 90 are fixed to the forward edge portion 102 of the upper portion 100 of the housing 82 by a plurality of fasteners such as bolts 230 and nuts 232.

Figure 9:
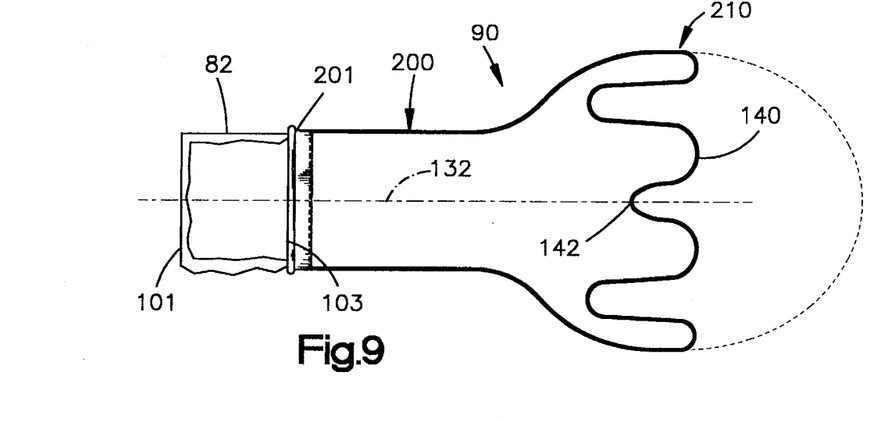
FIG. 9 is a schematic view illustrating a first stage in the folding of the air bag of FIG. 1.
Figure 10:
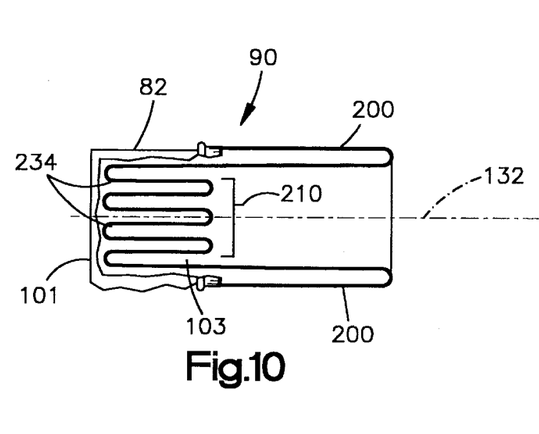
FIG. 10 is a view similar to FIG. 9 illustrating a second stage in the folding of the air bag.
Figure 11:
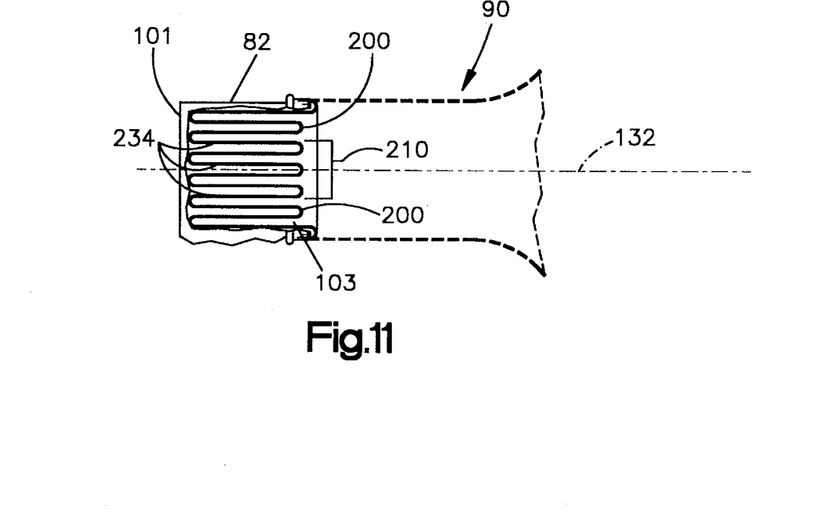
FIG. 11 is a view similar to FIG. 10 illustrating a third stage in the folding of the air bag.

The air bag 90 is then folded inside the upper portion 100 of the housing 82 in a manner shown schematically in FIGS. 9–11. In the first step of the folding process, the outer peripheral side portion 140 of the air bag 90, including the terminal end 142, is tuck folded inside the body portion 210 of the air bag, to a condition as shown schematically in FIG. 9. Next, the entire body portion 210 of the air bag 90 is tuck folded inside the neck portion 200 of the air bag and then into the upper portion 100 of the housing 82 in a manner as shown schematically in FIG. 10. In this condition, the body portion 210 of the air bag 90 includes a series of folded portions 234 which extend between the back wall 101 of the housing 12 and the deployment opening 103 in the retaining ring 86. Finally, the neck portion 200 of the air bag 90 is folded into the upper portion 100 of the housing 82, so as to wrap around the outside of the folded body portion 210, as illustrated schematically in FIG. 11. As a result, the body portion 210 of the air bag 90 is folded in a tight clump within the folded neck portion 200 of the air bag.

The assembled air bag module 80 is secured to the seat frame member 34 in the seatback 22, at a location adjacent to the headrest 32. The forward edge portion 102 of the housing 82 preferably faces outward at an angle $\beta$ (FIG. 4) to the front-to-back axis 36 of the vehicle seat 12 and upward at an angle $\alpha$ (FIG. 3) from the horizontal. Specifically, the module 80 is mounted on the seatback 22 so that when the seatback is reclined at an angle of 25° from the vertical, as seen in FIGS. 2 and 3, the air bag 90 deploys in a forward direction, as described below, with the longitudinal central axis 132 extending (a) at an angle $\alpha$ of 15° upward from the horizontal and (b) at an angle $\beta$ of 26° outward of the front-to-back axis 36. These angles are selected to enable the elongate neck portion 200 and body portion 210 of the air bag 90, when inflated, to lie adjacent to the head and neck of an upright seated occupant 52. The body portion 210 of the air bag 90, when inflated, is engageable by the head and neck of a forward leaning vehicle occupant 52. These angles help to ensure deployment of the air bag 90 outward from the head and neck of the occupant, and thus to minimize forces to the head and neck should the inflating air bag inadvertently strike the vehicle occupant.

Figure 12:
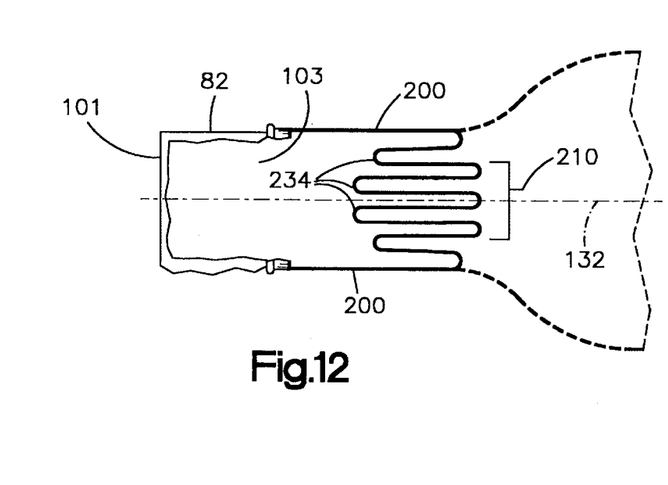
FIG. 12 is a schematic view illustrating a first stage in the inflation of the air bag.

In the event of a side impact to the vehicle 14 of a magnitude sufficient to require protection of the vehicle occupant 52, the inflator 84 is actuated in a known manner and directs inflation fluid under pressure into the chamber 98 in the housing 82. The walls of the housing 82 direct the inflation fluid through the inflation fluid opening 202 in the mouth portion 201 of the air bag 90 and into the elongate neck portion 200 of the air bag. The inflation fluid flows through the elongate neck portion 200 of the air bag 90 and thence into the body portion 210. The air bag 90 inflates in a manner as illustrated schematically in FIG. 12 from a folded, stored condition to an inflated condition as illustrated in FIGS. 1–3.

The elongate neck portion 200 of the air bag 90 inflates before the body portion 210, because the body portion is tucked and folded inside the elongate neck portion 200. The elongate neck portion 200 of the air bag 90 inflates adjacent to the occupant's neck and head. Because of the narrow tubular configuration of the elongate neck portion 200 of the air bag 90, the inflating air bag stays in a tight bundle or small clump as the elongate neck portion inflates, for about the first one third of the total deployment distance. One third of the deployment distance is typically a distance of about 20 cm to 25 cm.

Figure 4:
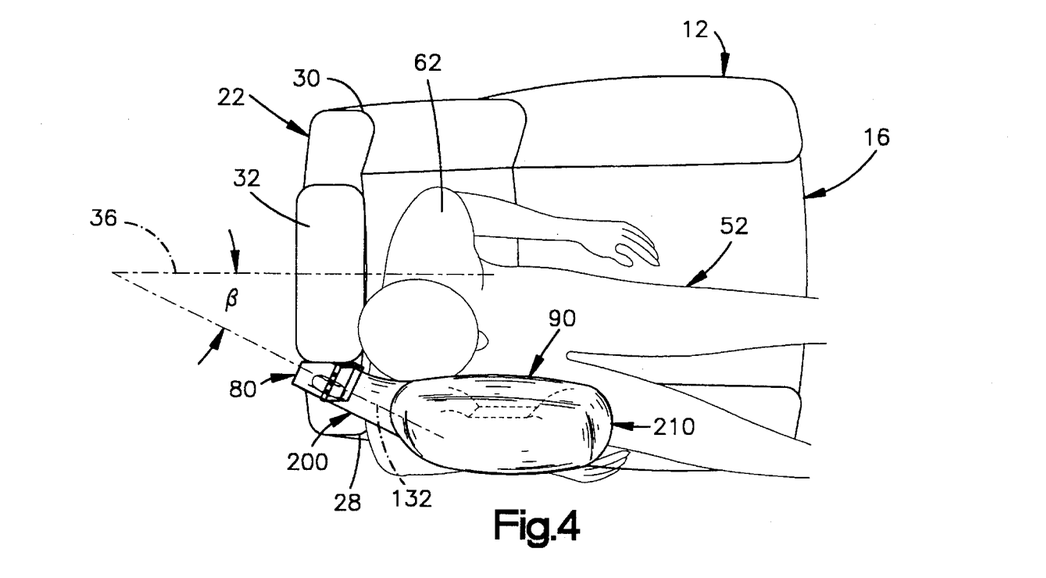
FIG. 4 is a schematic top plan view of the vehicle seat and occupant of FIG. 2.

At this point, the inflating air bag 90 typically extends to a position adjacent to the head of the occupant 52 and only the elongate neck portion 200 of the air bag 90 is inflated. The body portion 210 of the air bag 90 is still folded in a small bundle as illustrated schematically in FIG. 12. After the elongate neck portion 200 of the air bag 90 inflates, the body portion 210 of the air bag inflates and billows out to a position between the occupant's head and the inner side surface 44 of the vehicle window 42, as seen in FIGS. 2 and 4.

The inflator 84 preferably is rated at 7–9 KPA/ms (kilo-Pascals per millisecond), based upon a one cubic foot enclosed tank. Thus, when the inflator 84 in testing is actuated so that its inflation fluid output is directed into a one cubic foot enclosed tank, the pressure in the tank increases at a rate of 7–9 KPa/ms. Together with the relatively small size of the inflating air bag bundle which is due to the narrowness of the neck portion 200, this relatively modest inflation fluid flow rate causes the inflating air bag to move past the occupant's head and neck at a relatively low speed. Accordingly, less force is transmitted to the vehicle occupant if the inflating air bag 90 inadvertently strikes the occupant, as can occur if the occupant is "out of position". This low deployment speed also helps to ensure that the air bag 90 inflates properly past the vehicle seat belt system 50.

The elongate neck portion 200 of the air bag 90, when inflated, has a relatively small height as measured in a vertical direction transverse to the axis 132. The body portion 210 of the air bag 90, when inflated, has a relatively large height as measured in the vertical direction transverse to the axis 132. The elongate neck portion 200 of the air bag 90 is relatively narrow as compared to the body portion 210. That is, the height "A" (FIG. 5) of the elongate neck portion 200 of the air bag 90, as measured in a direction perpendicular to the axis 132, is substantially less than the height "B" of the body portion 210 of the air bag as measured in the same direction. The inflated air bag 90 is thus paddled-shaped in configuration, as best seen in FIG. 5. The relatively great height of the body portion 210 of the air bag 90 ensures that it is engageable by a forward leaning vehicle occupant even if the occupant is unusually tall or short.

The air bag 90 inflates between the head and neck of the occupant 52 of the vehicle 14, and the vehicle window 42 or B-pillar 46. The inflated air bag 90 is located between the occupant 52 and the shoulder belt portion 60 of the belt webbing 54. As illustrated, approximately 20% of the inflated air bag 90 is disposed above the D-ring 68, although substantially more than 20% of the inflated air bag can be disposed above the D-ring. The air bag 90 extends between the seat 12 and the door 40 to protect the occupant 52 of the seat from a forceful impact with the door. The inflated air bag 90 can also protect the occupant 52 from an object intruding through the door 40 or window 42 into the passenger compartment of the vehicle 14.

In the preferred embodiment of the invention, the air bag module 80 is mounted on the seat frame member 34 at a location separate from and next to the headrest 32. The module 80 is preferably enclosed by the same piece of fabric material covering which covers the headrest 32. The air bag 90 inflates through a seam in the fabric. Thus, no separate cover for the air bag module 80 is needed.

The module 80 may be mounted on a vehicle seat having a headrest which is movable relative to the other portions of the seatback. In this case, the module 80 is preferably secured on the seatback so that the module does not move with the headrest when the headrest moves relative to the other portions of the seatback. Alternatively, the air bag module 80 can be mounted in a movable headrest. In this case, the module 80 would move with the headrest as the headrest is adjusted relative to the other portions of the vehicle seatback.

From the above description of the invention, those skilled in the art will perceive improvements, changes and modifications in the invention. For example, the relative proportions of the elongate neck portion 200 and the body portion 210 of the air bag 90, as well as the overall dimensions of the air bag, can be different from those of the illustrated air bag. Such improvements, changes and modifications within the skill of the art are intended to be covered by the appended claims.

Having described the invention, I claim:

1. A vehicle safety apparatus comprising:

a seat for supporting an occupant of the vehicle in a seated position with the occupant's head disposed adjacent to a side structure of the vehicle, said seat including a seat bottom portion and a seatback;

a housing;

an inflatable vehicle occupant restraint in said housing for, when inflated, protecting the occupant of the vehicle, said inflatable restraint having a neck portion and a body portion which lie adjacent to the occupant's head and neck when inflated for engagement by the occupant's head and neck;

an inflator for directing inflation fluid into said inflatable restraint to inflate said inflatable restraint;

means for sensing a side impact to the vehicle of a magnitude sufficient to require protection of the vehicle occupant and for actuating said inflator to inflate said inflatable restraint in response to sensing said side impact to the vehicle; and support means for supporting said housing on said seatback for inflation of said body portion of said inflatable restraint between the vehicle occupant's head and the vehicle side structure;

said neck portion of said inflatable restraint having an elongate tubular configuration and being connected in fluid communication between said inflator and said body portion of said inflatable restraint;

said neck portion of said inflatable restraint when inflated extending from said housing and having a longitudinal central axis extending through said neck portion;

said neck portion of said inflatable restraint when inflated having a relatively small height as measured in a vertical direction transverse to said axis and said body portion of said inflatable restraint when inflated having a relatively large height as measured in said vertical direction transverse to said axis.

2. A vehicle safety apparatus as set forth in claim 1 wherein said longitudinal central axis of said neck portion of said inflatable restraint extends at an angle of about 15° above the horizontal when said inflatable restraint is inflated and said seatback is reclined at an angle of about 25° from the vertical.

3. A vehicle safety apparatus as set forth in claim 2 wherein said longitudinal central axis of said neck portion of said inflatable restraint extends forward at an angle of about 26° outward from a front-to-back axis of the vehicle when said inflatable restraint is inflated and said seatback is reclined at an angle of about 25° from the vertical.

4. A vehicle safety apparatus as set forth in claim 1 wherein said longitudinal central axis of said neck portion of said inflatable restraint extends forward at an angle of about 26° outward from a front-to-back axis of the vehicle when said inflatable restraint is inflated and said seatback is reclined at an angle of about 25° from the vertical.

5. A vehicle safety apparatus as set forth in claim 1 wherein said seatback of said vehicle seat includes a headrest, said housing being supported on said seatback at a location between said headrest and the vehicle side structure.

6. A vehicle safety apparatus as set forth in claim 1 wherein the height of said body portion of said inflatable restraint is in the range of from about twice the height of said neck portion of said inflatable restraint to about four times the height of said neck portion of said inflatable restraint.

7. A vehicle safety apparatus as set forth in claim 1 wherein said body portion of said inflatable restraint is tuck folded inside said elongate neck portion and said neck portion and said body portion are tuck folded inside said housing.

8. A vehicle safety apparatus as set forth in claim 7 wherein said neck portion of said inflatable restraint is folded into said housing so as to wrap around said folded body portion of said inflatable restraint, said body portion of said inflatable restraint being folded in a tight bundle within said folded neck portion of said inflatable restraint, said body portion remaining folded in a tight bundle within said folded neck portion during inflation of said neck portion.

9. A vehicle safety apparatus as set forth in claim 1 wherein said inflator is rated at 7–9 kiloPascals per millisecond based upon a one cubic foot enclosed tank, whereby said neck portion of said inflatable restraint inflates at a relatively low speed.

10. A vehicle safety apparatus as set forth in claim 1 wherein said neck portion of said inflatable restraint has a height of about 120 mm when inflated and said body portion of said inflatable restraint has a height of about 310 mm when inflated.

11. A vehicle safety apparatus as set forth in claim 10 wherein said neck portion of said inflatable restraint has a length of about 230 mm when inflated and said body portion of said inflatable restraint has a length of about 340 mm when inflated.

12. A vehicle safety apparatus comprising:

a seat for supporting an occupant of the vehicle in a seated position with the occupant's head disposed adjacent to a side structure of the vehicle, said seat including a seat bottom portion and a seatback which includes a seatback cushion portion and a headrest portion;

a housing having a deployment opening;

an inflatable vehicle occupant restraint in said housing for, when inflated, protecting the occupant of the vehicle, said inflatable restraint having a neck portion and a body portion which lie adjacent to the occupant's head and neck when inflated for engagement by the occupant's head and neck;

an inflator connected in fluid communication with said inflatable restraint for directing inflation fluid into said inflatable restraint to inflate said inflatable restraint through said deployment opening;

means for sensing a side impact to the vehicle of a magnitude sufficient to require protection of the vehicle occupant and for actuating said inflator to inflate said inflatable restraint in response to sensing said side impact to the vehicle; and support means for supporting said housing on said seatback for inflation of said body portion of said inflatable restraint between the vehicle occupant's head and the vehicle side structure;

said neck portion of said inflatable restraint when inflated having an elongate tubular configuration and having a longitudinal central axis extending through said neck portion;

said body portion of said inflatable restraint when inflated having a height as measured in a vertical direction transverse to said axis which is substantially greater than the height of said neck portion of said inflatable restraint when inflated;

said body portion of said inflatable restraint being tuck folded inside said tubular neck portion of said inflatable restraint, said neck portion of said inflatable restraint being tuck folded inside said housing.

13. A vehicle safety apparatus as set forth in claim 12 wherein said body portion of said inflatable restraint includes a series of folded portions which extend between a back wall of said housing and said deployment opening in said housing.

14. A vehicle safety apparatus as set forth in claim 13 wherein said neck portion of said inflatable restraint is folded into an upper portion of the housing so as to wrap around said folded portions of said body portion of said inflatable restraint, said body portion of said inflatable restraint being folded in a tight bundle within said folded neck portion of said inflatable restraint.

15. A vehicle safety apparatus as set forth in claim 14 wherein said body portion remains folded in a tight bundle within said folded neck portion during inflation of said neck portion.

16. A vehicle safety apparatus as set forth in claim 12 wherein said inflator is rated at 7–9 kiloPascals per millisecond based upon a one cubic foot enclosed tank, whereby said neck portion of said inflatable restraint inflates at a relatively low speed.

17. A vehicle safety apparatus as set forth in claim 12 wherein said longitudinal central axis of said neck portion of said inflatable restraint extends forward at an angle of about 15° above the horizontal and at an angle of about 26° outward from a front-to-rear axis of the vehicle when said inflatable restraint is inflated when said seatback is reclined at an angle of about 25° from the vertical.

18. A vehicle safety apparatus as set forth in claim 12 wherein the height of said body portion of said inflatable restraint, when inflated, is in the range of from about twice the height of said elongate neck portion of said inflatable restraint to about four times the height of said elongate neck portion of said inflatable restraint.

19. A vehicle safety apparatus as set forth in claim 18 wherein said elongate neck portion of said inflatable restraint has a height of about 120 mm and said body portion of said inflatable restraint has a height of about 310 mm.

20. A vehicle safety apparatus as set forth in claim 19 wherein said neck portion of said inflatable restraint has a length of about 230 mm and said body portion of said inflatable restraint has a length of about 340 mm.

21. A vehicle safety apparatus comprising:

a seat for supporting an occupant of the vehicle in a seated position with the occupant's head disposed adjacent to a side structure of the vehicle, said seat including a seat bottom portion and a seatback;

a housing;

an inflatable vehicle occupant: restraint in said housing for, when inflated, protecting the occupant of the vehicle, said inflatable restraint having a neck portion and a body portion which lie adjacent to the occupant's neck and head when inflated;

an inflator connected in fluid communication with said inflatable restraint for directing inflation fluid into said inflatable restraint to inflate said inflatable restraint;

means for sensing a side impact to the vehicle of a magnitude sufficient to require protection of the vehicle occupant and for actuating said inflator to inflate said inflatable restraint in response to sensing said side impact to the vehicle; and support means for supporting said housing on said seatback for inflation of said body portion of said inflatable restraint between the vehicle occupant's head and the vehicle side structure; and said body portion of said inflatable restraint being tuck folded inside said neck portion, and said neck portion and said body portion together being tuck folded inside said housing, said neck portion inflating prior to inflation of said body portion.

22. A vehicle safety apparatus as set forth in claim 21 wherein said neck portion of said inflatable restraint has an elongate tubular configuration and is connected in fluid communication between said inflator and said body portion of said inflatable restraint;

said neck portion of said inflatable restraint when inflated extending from said housing and having a longitudinal central axis extending through said neck portion;

said neck portion of said inflatable restraint when inflated having a relatively small height as measured in a vertical direction transverse to said axis and said body portion of said inflatable restraint when inflated having a relatively large height as measured in said vertical direction transverse to said axis.

23. A vehicle safety apparatus as set forth in claim 22 wherein said longitudinal central axis of said neck portion of said inflatable restraint extends forward at an angle of about 15° above the horizontal and at an angle of about 26° outward from a front-to-back axis of the vehicle when said inflatable restraint is inflated and said seatback is reclined at an angle of about 25° from the vertical.

24. A vehicle safety apparatus as set forth in claim 22 wherein the height of said body portion of said inflatable restraint is in the range of from about twice the height of said elongate neck portion of said inflatable restraint to about four times the height of said neck portion of said inflatable restraint.

25. A vehicle safety apparatus as set forth in claim 21 wherein said neck portion of said inflatable restraint has a height of about 120 mm and said body portion of said inflatable restraint has a height of about 310 mm, said neck portion of said inflatable restraint having a length of about 230 mm and said body portion of said inflatable restraint having a length of about 340 mm.

26. A vehicle safety apparatus as set forth in claim 21 wherein said neck portion of said inflatable restraint is folded into said housing so as to wrap around said folded body portion of said inflatable restraint, said body portion of said inflatable restraint being folded in a tight bundle within said folded neck portion of said inflatable restraint, said body portion remaining folded in a tight bundle within said folded neck portion during inflation of said neck portion.

27. A vehicle safety apparatus as set forth in claim 21 wherein said inflator is rated at 7–9 kiloPascals per millisecond based upon a one cubic foot enclosed tank, whereby said neck portion of said inflatable restraint inflates at a relatively low speed.

28. A vehicle safety apparatus comprising:
   a seat for supporting an occupant of the vehicle in a seated position with the occupant's head disposed adjacent to a side structure of the vehicle, said seat including a seat bottom portion and a seatback;
   a housing;
   an inflatable vehicle occupant restraint in said housing for, when inflated, protecting the occupant of the vehicle, said inflatable restraint having a body portion and a neck portion which lie adjacent to the occupant's head and neck when inflated for engagement by the occupant's head and neck;
   an inflator for directing inflation fluid into said inflatable restraint to inflate said inflatable restraint;
   means for sensing a side impact to the vehicle of a magnitude sufficient to require protection of the vehicle occupant and for actuating said inflator to inflate said inflatable restraint in response to sensing said side impact to the vehicle; and
   support means for supporting said housing on said seatback for inflation of said body portion of said inflatable restraint between the vehicle occupant's head and the vehicle side structure;
   said neck portion of said inflatable restraint having an elongate tubular configuration and being connected in fluid communication between said inflator and said body portion of said inflatable restraint;
   said neck portion of said inflatable restraint when inflated extending from said housing and having a longitudinal central axis extending through said neck portion;
   said neck portion of said inflatable restraint when inflated having a relatively small height as measured in a vertical direction transverse to said axis and said body portion of said inflatable restraint when inflated having a relatively large height as measured in said vertical direction transverse to said axis;
   said longitudinal central axis of said neck portion of said inflatable restraint extending forward at an angle of about 26° outward from a front-to-back axis of the vehicle when said inflatable restraint is inflated and said seatback is reclined at an angle of about 25° from the vertical;
   said neck portion of said inflatable restraint being folded into said housing so as to wrap around said body portion of said inflatable restraint, said body portion of said inflatable restraint being folded in a tight bundle within said folded neck portion of said inflatable restraint, said body portion remaining folded in a tight bundle within said folded neck portion during inflation of said neck portion;
   said inflator being rated at 7–9 kiloPascals per millisecond based upon a one cubic foot enclosed tank, whereby said neck portion of said inflatable restraint inflates at a relatively low speed.

* * * * *